United States Patent [19]

Ferens

[11] Patent Number: 5,757,634
[45] Date of Patent: May 26, 1998

[54] MULTIPARALLELING SYSTEM OF VOLTAGE SOURCE POWER CONVERTERS

[75] Inventor: Jerzy Ferens, Bolton, Canada

[73] Assignee: Siemans Electric Limited, Brampton, Canada

[21] Appl. No.: 773,648

[22] Filed: Dec. 24, 1996

[51] Int. Cl.[6] .................................................. H02M 7/5395
[52] U.S. Cl. ........................... 363/72; 363/41; 363/95
[58] Field of Search ........................ 363/41, 65, 71, 363/720, 95

[56] References Cited

U.S. PATENT DOCUMENTS

| | | | |
|---|---|---|---|
| 4,174,534 | 11/1979 | Kotlarewsky | 363/26 |
| 4,734,844 | 3/1988 | Rhoads | 363/72 |
| 4,886,981 | 12/1989 | Lentini et al. | 363/72 |
| 5,122,726 | 6/1992 | Elliott et al. | 363/72 |
| 5,130,561 | 7/1992 | Elliott et al. | 363/72 |
| 5,157,269 | 10/1992 | Jordan et al. | 363/72 |
| 5,191,519 | 3/1993 | Kawakami | 363/71 |
| 5,191,520 | 3/1993 | Eckersley | 363/72 |
| 5,193,054 | 3/1993 | Galloway et al. | 363/72 |
| 5,253,155 | 10/1993 | Yamamoto | 363/71 |
| 5,408,404 | 4/1995 | Mitchell | 363/71 |
| 5,436,512 | 7/1995 | Inam et al. | 363/71 |
| 5,436,823 | 7/1995 | Araki | 363/71 |
| 5,446,645 | 8/1995 | Shirahama et al. | 363/71 |
| 5,450,309 | 9/1995 | Rohner | 363/71 |
| 5,473,528 | 12/1995 | Hirata et al. | 363/71 |

*Primary Examiner*—Jeffrey L. Sterrett
*Attorney, Agent, or Firm*—Woodard, Fmhardt, Naughton, Moriarty & McNett

[57] ABSTRACT

A system of multiparalleling a set of voltage source power converters is provided in which any one of the converters may assume the role of a master or a slave. The system can survive the failure of either the master or any of the slaves. A main controller issues PWM command signals to control the current generated in the power converters. The PWM command signal is modified for each power converter such that all of the converters produce the substantially the same current, the current generated in the master unit being used as a reference. A current feedback signal is used to provide the main controller with an accurate estimate of the total current generated by the system.

32 Claims, 7 Drawing Sheets tv-INTERLOCK TIME 5,757,634

MULTIPARALLELING SYSTEM OF VOLTAGE SOURCE POWER CONVERTERS

FIELD OF THE INVENTION

The invention relates to the multiparalleling of voltage source power converters.

BACKGROUND OF THE INVENTION

It is common to combine multiple standard voltage source power converters in parallel to provide a reliable PWM (pulse width modulation) power source of large capacity. A typical conventional multiparallel system includes a master unit and a number of slave units acting as "current boosters". The master unit provides a system-level control while each of the slave units performs a local current control under the direction of the master unit. In any system having a large power level and a high complexity it is highly desirable to minimize the "down time" that follows a failure of one of its components. Conventional multiparallel systems are usually designed to operate at a reduced capacity when one of the slave units fails.

A problem with many conventional systems is that they cannot survive a failure of the master unit. Thus while very little or no down time results from the failure of a slave unit, an extensive down time may result from the failure of the master unit since the entire system must be shut down to repair the master.

In some known systems, master and slave unit interchangeability is provided, but there is no means for accurately controlling the current produced by the entire system when running normally or at reduced capacity.

U.S. Pat. No. 4,734,844 which issued on Mar. 24, 1988 to Rhoades entitled "Master/Slave Current Sharing, PWM Power Supply" discloses a system of paralleling power supplies in which each of the power supply units can be configured either as a stand alone power supply, a master of a master/slave combination, or a slave of a master/slave combination. The current in the master is controlled with a PWM modulator. A feedback signal from within the master is used to control the PWM modulator. Basically the same PWM signal is fed to the slave unit. There is no feedback from the slave unit to the master to provide an overall current control. Rather, it is assumed that the current produced by the slave units is substantially identical to that produced by the master unit.

U.S. Pat. No. 4,174,534 which issued on Nov. 13, 1979 to Kotlarewsky entitled "Master-Slave Voltage Regulator Employing Pulse Width Modulation" discloses a system for producing a regulated output voltage (AC or DC) from an input DC voltage. A master/slave configuration is disclosed, but no suggestion of interchangeability of the master and slave functionality is made.

U.S. Pat. No. 5,122,726 which issued on Jun. 16, 1992 to Elliott et al entitled "Overvoltage Protection for Redundant Power Supply" discloses paralleled power supplies in which any of the units can dynamically become a master or slave unit. Faulty supplies shut themselves down in the case of overvoltage conditions.

U.S. Pat. No. 4,886,981 which issued on Dec. 12, 1989 to Lentini et al entitled "Synchronising Circuit for a Plurality of Power Units" discloses a multiparalleling system in which a clock signal is generated by a master unit and passed on to each of the slave units, thereby achieving synchronization, the master unit being selected by a polarity signal on a bus. When a particular unit is a master, it generates a polarity on the bus thereby communicating to the other units that they are to behave as slave units. This system lacks a method of accurate pulse by pulse current tracking.

U.S. Pat. No. 5,157,269 which issued on Oct. 20, 1992 to Jordan et al entitled "Load Current Sharing Circuit" discloses a multiparalleling system in which any of a series of power supplies may act as a master, the remaining units acting as slaves. A unit having the highest share of the load current is elected as the master, and the remaining units are slaves. The current of the master unit is adjusted downward and the current of the slave units is adjusted upward continuously so that all the units maintain substantially equal currents.

U.S. Pat. No. 5,436,823 which issued on Jul. 25, 1995 to Araki entitled "Parallel Operation Controller for Power Converters" discloses a three phase multiparalleling system in which each power converter is driven by a PWM signal which is adjusted by subtracting a three phase current detected at the output from a reference command current value. No suggestion is made of master slave interchangeability. The reference current is not the current generated in the master, but rather a reference command which is externally input.

U.S. Pat. No. 5,253,155 which issued on Oct. 12, 1993 to Yamamoto entitled "Circuit and Method for Controlling Output Current Balance Between Parallel Drive PWM-Type Power Inverting Units" discloses a control method that equalizes the output currents of two inverters connected in parallel. This method is limited to only two inverters. Furthermore, no master-slave current tracking function is performed with this method.

It is noted that many of the above references disclose details of paralleling of low power switch-mode supplies that produce DC output and operate at high switching frequencies. Pulse by pulse current tracking is not as effective in these applications as it is in higher power/lower switching frequency applications, for example multi-kilowatt to multi-megawatt applications where the switching frequency is in the low kHz range.

None of the above references discloses a system of paralleling an arbitrary number of identical PWM converters which allows controlling the operation of the whole system on a pulse by pulse basis, and which has a master-slave interchangeability that makes the system capable of surviving multiple failures.

SUMMARY OF THE INVENTION

It is an object of the invention to provide an improved system of multiparalleled voltage source power converters.

According to a first broad aspect, the invention provides a PWM (pulse width modulation) multiparallel power converter system for driving a common load, the system comprising: a plurality of power units each having a voltage source power converter which outputs a local current feedback signal representative of current generated by the voltage source power converter, and each having a reactor through which to connect the voltage source power converter to the common load; PWM signal modification means for generating a local PWM signal for each voltage source power converter which is a version of a main PWM signal modified as a function of the difference between a reference current signal and the local current feedback signal of the respective power unit; and master unit selection means for selecting the current feedback signal of one of the power units as the reference current signal, thereby selecting that unit as the master unit.

According to a second broad aspect, the invention provides a PWM multiparallel power inverter system comprising: main PWM command generation means which generates a main PWM command signal consisting of PWM pulses as a function of a main current feedback signal; a master power unit and at least one slave power unit, the main PWM command generation means being connected to supply the master unit with the main PWM command signal, and to receive the main current feedback signal from the master unit; the at least one slave unit being connected to receive from the master unit the main PWM command signal and a reference current signal; each power unit comprising: i) a voltage source power converter which generates current based upon a local PWM command signal, and generates a local current feedback signal representative of the current being generated by the respective voltage source power converter, the reference current signal being the local current feedback signal of the master unit; ii) PWM modification means for modifying the PWM pulses in the main PWM command signal as a function of the difference between the local current feedback signal and the reference current signal to create the local PWM command signal; and means for generating the main current feedback signal as a function of the local current feedback signals.

According to a third broad aspect, the invention provides a PWM multiparallel power converter system comprising: a main controller which generates a main PWM command signal as a function of a main current feedback signal; a plurality of power units, each power unit comprising: i) a paralleling interface; ii) a voltage source power converter and output reactor; iii) a first signal path from the voltage source power converter to the paralleling interface for carrying a local current feedback signal representative of the current being generated by the respective voltage source power converter; iv) a second signal path from the paralleling interface to the voltage source power converter for carrying a local PWM command signal controlling how much current is generated by the voltage source power converter; each paralleling interface comprising: i) master unit selecting means for selecting the respective power unit as the master unit, the remaining power units being slave units, the main controller being connected to the master unit such that the master unit receives the main PWM command signal from the main controller, and the main controller receives the main current feedback signal from the master unit; ii) reference current means for providing a reference current signal from the master unit to each of the slave units, the reference current signal being equal to the local current feedback signal of the master unit; iii), summing means for summing all of the local current feedback signals to generate the main current feedback signal; iv) main command means for providing said main current command signal to each paralleling interface; v) PWM command modification means for modifying the main PWM command signal as a function of the difference between the local current feedback signal and the reference current signal to create the local PWM command signal such that the current generated approaches said reference current signal.

According to a fourth broad aspect, the invention provides a paralleling interface for connection to a respective PWM voltage source power converter in a system of multiparalleled PWM voltage source power converters, the paralleling interface comprising: main PWM signal input means for receiving a main PWM command signal; local PWM signal output means for sending a local PWM signal to the respective voltage source power converter; local current feedback input means for receiving from the respective voltage source power converter a local current feedback signal representative of the current generated in the voltage source power converter; current feedback input means for receiving a current feedback signal from an adjacent paralleling interface; master unit selecting means for switching the paralleling interface between assuming the role of a master and the role of a slave; reference current output means for providing to an adjacent paralleling interface a reference current output signal equal to the local current feedback signal of the master unit in the case in which the paralleling interface is assuming the role of the master; reference current input means for receiving from an adjacent paralleling interface a reference current input signal equal to the local current feedback signal of a unit assuming the role of the master in the case in which the paralleling interface is assuming the role a slave; summing means outputting a main current feedback signal equal to the sum of the local current feedback signal and the current feedback signal; PWM signal modification means for modifying the main PWM signal as a function of the difference between the local current feedback signal and the reference current signal to create the local PWM signal.

An advantage of the multiparalleling system according to some embodiments of the invention is that any unit may be configured as a master unit, making the multiparalleled system capable of surviving even multiple failures.

Another advantage in some embodiments is that a pulse-by-pulse current tracking system is used which allows a level of dynamic performance in the multiparalleled system to be maintained at the same level as the performance of a single inverter. This also allows the use of smaller interphase reactances and lower derating of paralleled inverters when compared with systems using known asynchronous tracking methods. The system can be used, for example, for vector-controlled, large capacity motor drives, high-power static generators or synchronous rectifiers.

BRIEF DESCRIPTION OF THE DRAWINGS

Preferred embodiments of the invention will now be described with reference to the attached drawings in which.

DETAILED DESCRIPTION OF THE PREFERRED EMBODIMENT

Figure 1:
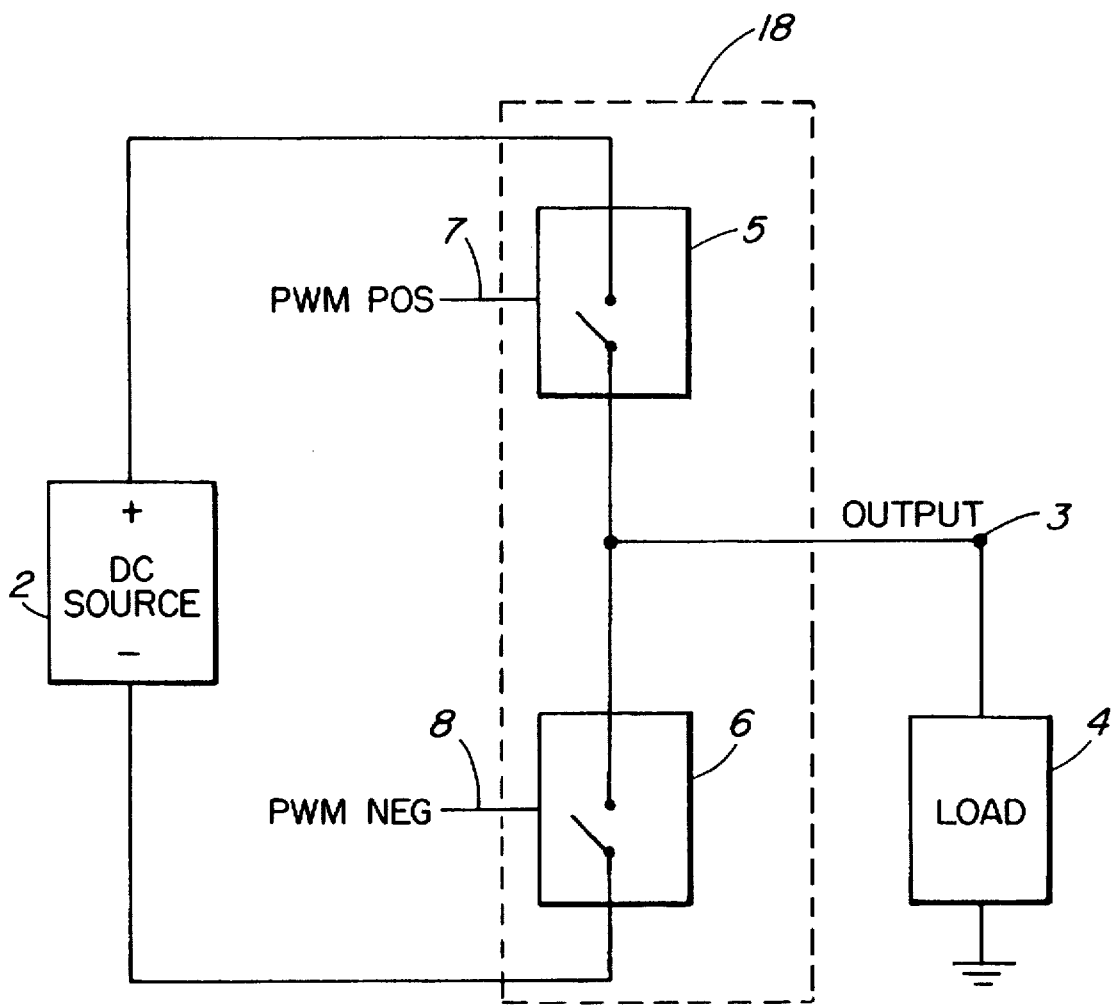
FIG. 1 is a block diagram of a conventional voltage source inverter.

The purpose of a conventional PWM (pulse width modulation) voltage source power converter is to convert an input power signal of one type into an output power signal of another type. FIG. 1 is a schematic of a type of power converter generally indicated by 18 referred to as a voltage source inverter, in which power supplied from a DC source 2 is converted into an AC power output 3 across a load 4. A first switch 5 when activated connects the output to the positive terminal of the DC source 2, and a second switch 6 when activated connects the output 3 to the negative terminal of the DC source 2. The switches 5,6 are power switches, for example, transistors, IGBTs (insulated gate bipolar transistor) or GTOs (gate turn on). The switches 5,6 are driven by signals carried on respective modulation channels 7,8. A first modulation signal PWM POS is carried on modulation channel 7, and a second modulation signal PWM NEG is carried on modulation channel 8. These modulation signals are pulse sequences with a variable duration of On and Off periods. The pulse sequences are used to control or modulate the connection of the DC power source to the power converter output resulting in the output having the desired AC characteristic. The two switches 5,6 are driven On and Off alternatively to avoid short circuiting of the DC source. A "safety" margin is usually added to the driving pulse pattern in the form of an "Interlock Time" or ("Dead Time") resulting in short periods of time when both switches are Off. Additional conditions (min/max) are also imposed on the duration of the pulses. Numerous topological and driving variations of PWM voltage inverters exist, but the underlying principle of producing the output voltage by varying the duration of On and Off states of power switches remains. A more detailed description of power converters can be found in "Power Semiconductor Circuits" by S. B. Dewan and A. Straughan, John Wiley & Sons, ISBN 0-471-21190-X.

Figure 2:
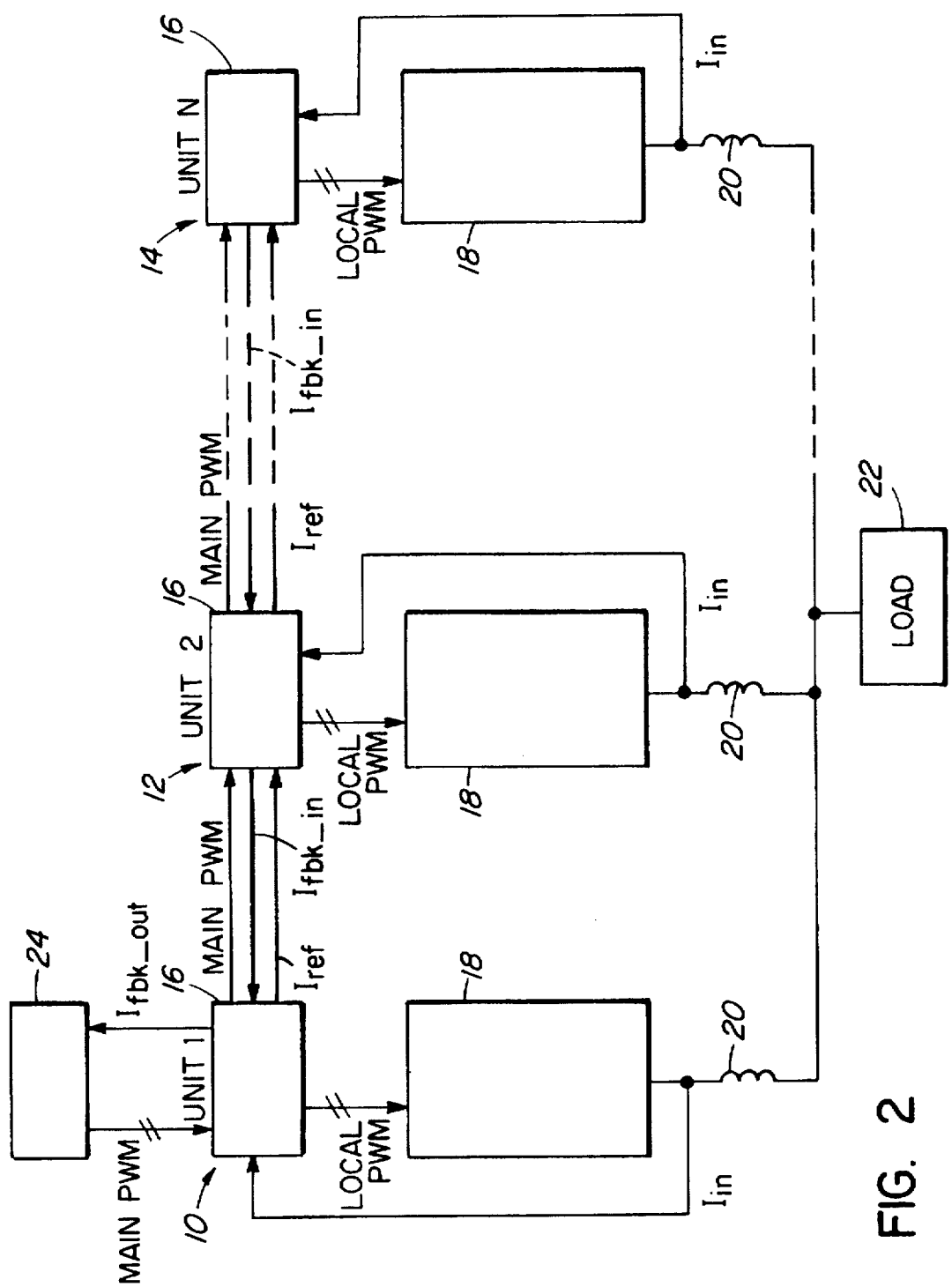
FIG. 2 is a block diagram of a multiparalleling system according to the invention.

Referring now to FIG. 2, a multiparalleling system according to the invention is shown in which a plurality N of power units are connected in parallel, only three of the power units 10,12,14 being illustrated. Each power unit has connected in sequence a paralleling interface 16, a voltage source power converter which may be a voltage inverter 18 for example, and an interphase reactor 20. At the outputs of the N power units, the corresponding outputs of all the interphase reactors 20 are connected together and to a load 22. At the inputs of the N power units, adjacent paralleling interfaces 16 are connected to each other. A main controller 24 is connected to the paralleling interface 16 of power unit 10. The power unit 10 to which the main controller 24 is connected is referred to as the master unit, while the remaining power units are referred to as slave units. It is noted that the master unit is actually the first active unit in the left-to-right sequence of power units 10,12,14. Thus, if power unit 10 fails, then power unit 12 assumes the role of the master unit. This is discussed in further detail below.

The purpose of the interphase reactors 20 is to provide a buffer which can accommodate the output voltage differences of short duration which exist between the power units 10, 12, 14 as a result of local current regulation.

Although not shown in FIG. 2, each power converter has a pair of switches for connection to a common DC source as illustrated in FIG. 1. The switches are controlled by modulation signals which are supplied to each power converter 18 by its respective parallelling interface 10 as described in detail below.

Figure 3:
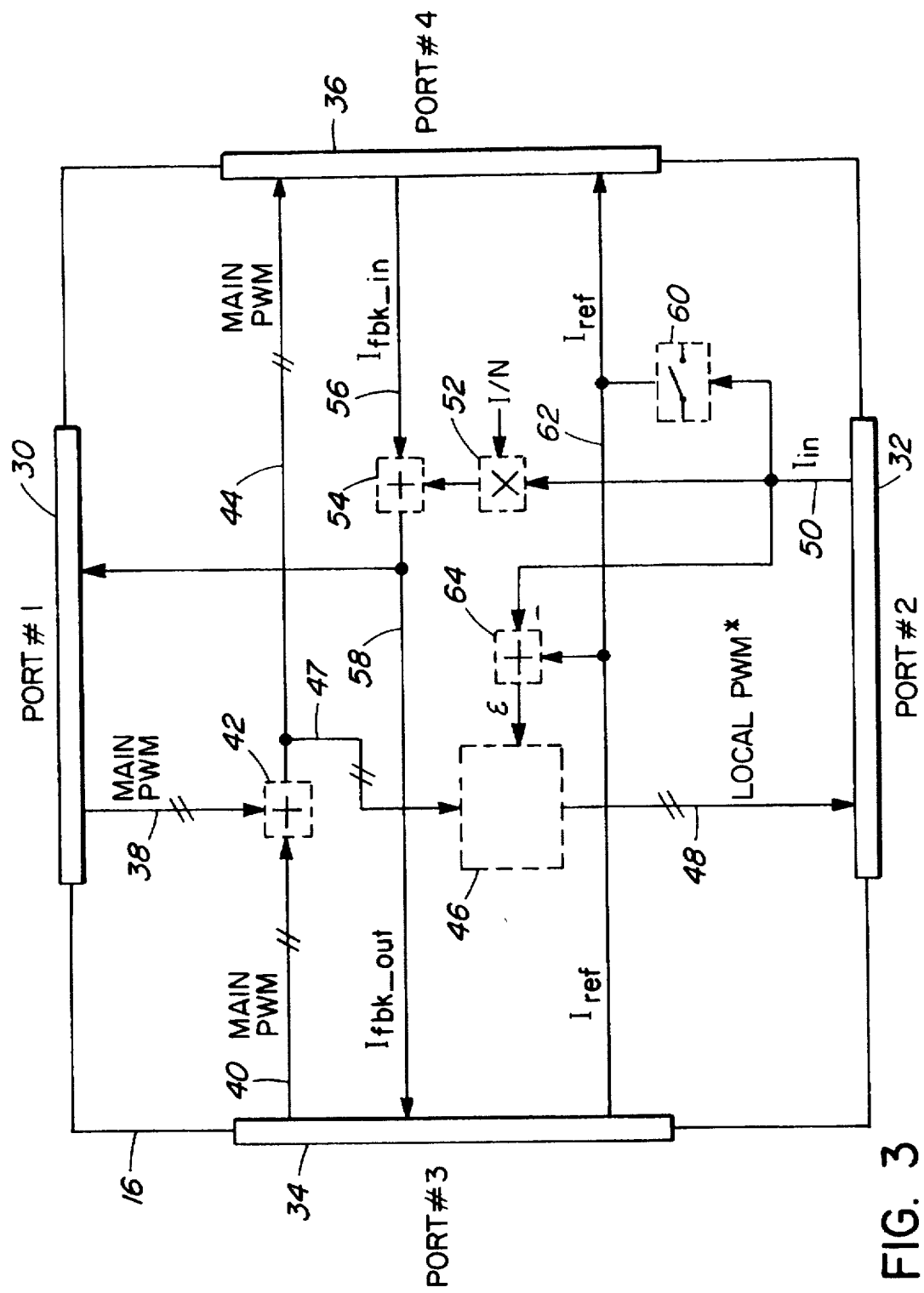
FIG. 3 is a block diagram of a paralleling interface for use in the multiparalleling system of FIG. 2.

Referring now to FIGS. 2 and 3, each paralleling interface 16 may be modelled as a four port circuit, the four port circuit having four ports 30,32,34,36 also labelled Port#1, Port#2, Port#3, and Port#4 respectively. Port#1 is for connection to the main controller 24 in the case in which the paralleling interface forms part of the master unit, and is not connected to anything in the case in which the paralleling interface forms part of one of the slave units. Port#2 is for connection to the respective power inverter 18. Port#3 of power unit 10 is not connected to anything, while Port#3 of the remaining power units is for connection to Port #4 of a respective adjacent power unit. Port#4 of the last power unit is not connected to anything.

Each paralleling interface 16 has PWM circuitry to pass PWM firing pulse signals between adjacent paralleling interfaces and to pass processed PWM firing pulse signals to the power inverters. In addition, each paralleling interface has current monitoring and feedback circuitry. It is noted that in the figures a single line is used to represent two modulation channels these being the positive and negative modulation channels, unless otherwise explicitly shown, although two physical lines are required for these channels.

The PWM circuitry includes PWM pulse input lines 38,40 from Port#1 and Port#3 respectively connected to an adder 42 which adds any signals on lines 38,40. An output of the adder 42 is connected to Port#4 through PWM pulse output line 44 and to a pulse processing circuit 46 through a line 47. A PWM pulse output line 48 of the pulse processing circuit 46 is connected to Port#2.

The various signals carried through the PWM circuitry will now be described. Main current command signals consisting of PWM signals originating from the main controller 24 are labelled "main PWM", and come from either the main controller 24 itself through line 38 if the particular power unit is the master unit, or from an adjacent paralleling interface through line 40 if the interface 16 is part of a slave unit. The purpose of PWM input lines 38,40, adder 42, and PWM output line 44 is to deliver this same main PWM signal to the pulse processing circuit 46 of each of the paralleling interfaces 16. In each paralleling interface only one of lines 38,40 connected to adder 42 carries the main PWM signal and the other of the lines is inactive resulting in the output of the adder 42 always being equal to the main PWM signal. The adders 42 of all of the paralleling interfaces are connected together in sequence through the respective Port#3 and Port#4 of each paralleling interface. Thus, the pulse processing circuit 46 of every paralleling interface has the same main PWM input signal. The pulse processing circuit 46 processes the main PWM input signal as discussed in detail below, and produces a local command signal "local PWM" on PWM output line 48. It is this local PWM signal which actually drives the power inverter 18.

The current monitoring and feedback circuitry includes a current input line 50 from Port#2 for carrying a signal representative of the current generated by the respective power inverter. Current input line 50 is connected through a scaler circuit 52 to an input of an adder 54. Also connected to an input of the adder 54 is an input current feedback line 56 from Port#4. The output of the adder 54 is connected to Port#3 through an output current feedback line 58. The current input line 50 is also connected through a switch 60 to a reference current line 62 which is connected to both Port#3 and Port#4. The current input line 50 and the reference current line 62 are also connected to two inputs of a difference circuit 64 an output of which is connected to the pulse processing circuit 46.

The various signals carried through the current monitoring and control circuitry will now be described. Current input line 50 carries a local current feedback signal "$I_{in}$" which is representative of the current being generated by the respective power inverter 18. Switch 60 is closed for the master unit, and is open for the slave units with the result that reference current line 62 carries a reference current signal "$I_{ref}$" which is equal to $I_{in}$ of the master unit. The reference current lines 62 of all of the paralleling interface circuits are connected together through Port#3 and Port#4 with the result that all of the paralleling interface circuits have access to the same $I_{ref}$ signal. The local current feedback signal $I_{in}$ of each paralleling interface is scaled with the scaler circuit 52 by a factor of 1/N and fed to adder 54 where it is added to an input current feedback signal $I_{fbk-in}$ on line 56, to produce an output current signal $I_{fbk-out}$ on line 58 which is effectively the sum of the scaled input current signals $I_{in}$ of all the paralleling interfaces to the right of the particular paralleling interface. It is preferable that the local current signal $I_{in}$ for each power unit be "normalized" by the converters such that a nominal output current is always represented by the same defined value. This permits a uniform processing of all the control variables independent of the real values of the physical quantities they represent. In this way, inverters having different current ratings will return the same $I_{in}$ signal when operating at their respective nominal currents. A second level of normalization is provided by the scalar circuit 52 which normalizes the current signal generated by the system as a whole which is fed back to the master controller 24. A system of N identical inverters will return a total current feedback signal to the controller 24 which represents the current generated by each unit when all N inverters operate at the same nominal current. In this system, the master controller 24 does not need to know how many power inverters there are, or what the power ratings of each inverter is, although it may be useful to provide the master controller with this information. The value N can be obtained automatically with a detection circuit (not shown) or set manually. This value may be used by the main controller for display purposes, error detection, and some additional signal processing. The difference circuit 64 produces a regulation error signal E for each phase which is equal to the reference current $I_{ref}$ minus the input current signal $I_{in}$. The regulation error signal E is used by the pulse processing circuit 46 in producing the local current command signal consisting of a local PWM signal as discussed in detail below. The output current feedback signal $I_{fbk-out}$ is also passed to Port#1 and to the main controller 24 if the particular unit is the master unit.

Figure 4:
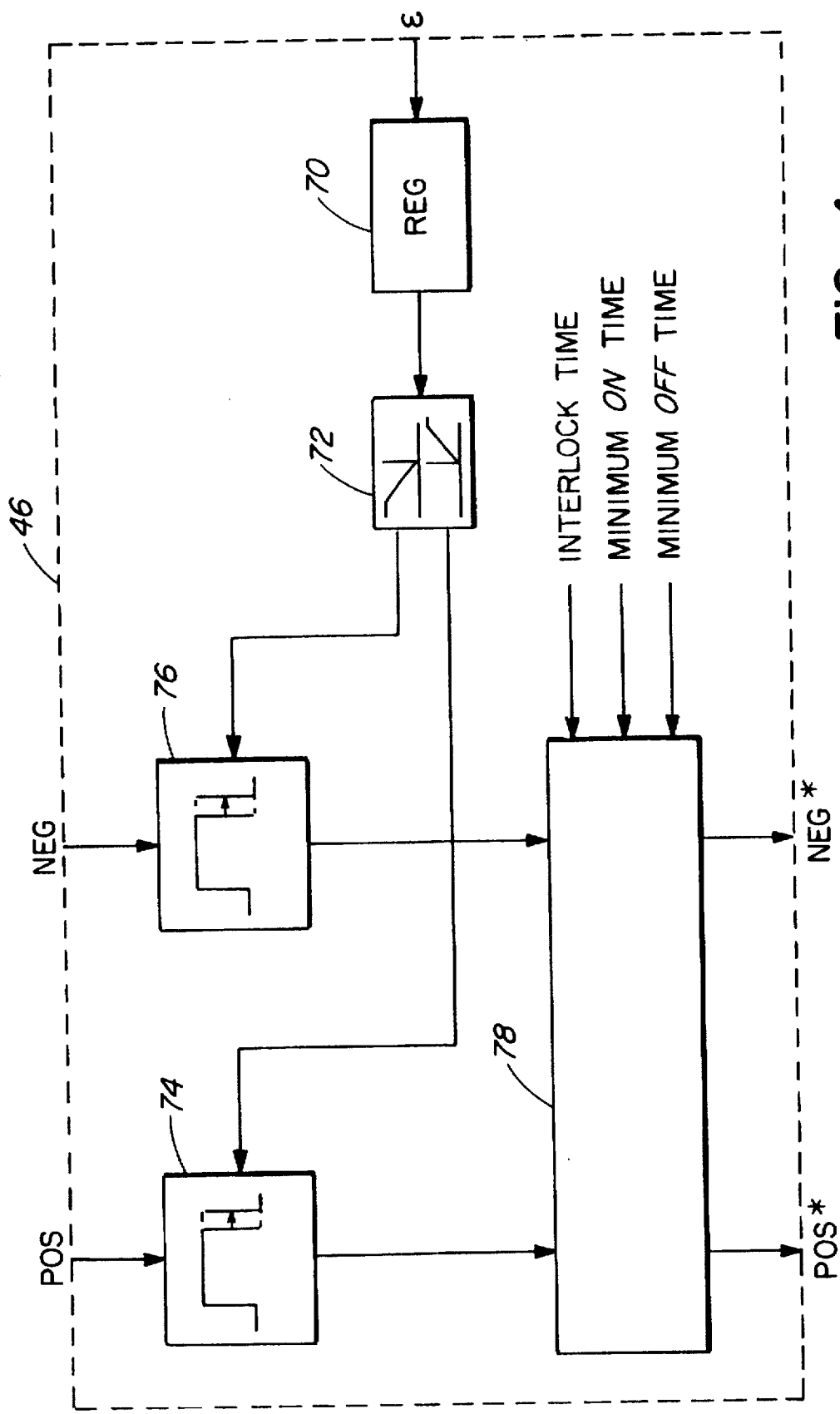
FIG. 4 is a block diagram of a PWM pulse processing circuit for use in the paralleling interface of FIG. 3.

Referring now to FIG. 4, the pulse processing circuit 46 includes a current regulator 70 connected to receive the regulation error E generated at the output of adder 64 shown in FIG. 3. The current regulator 70 is connected to a splitter 72 which is connected to two pulse delay circuits 74,76. The pulse delay circuits 74,76 have inputs which are connected to the PWM output line 44 so as to receive the main PWM signal. The splitter 72 separates the output of the current regulator 70 such that pulse delay circuit 74 delays the trailing edge of the positive PWM pulse signals when the regulator input is positive and pulse delay circuit 76 delays the trailing edge of the negative PWM pulse signals when the regulator input is negative. An output of each pulse delay circuit 74,76 is connected to a processor 78 an output of which is connected to PWM output line 48 for carrying the local PWM signal.

The operation of the master power unit will first be described. The main controller 24 generates PWM firing pulses and passes these in the form of the main PWM signal to the paralleling interface 16 of the master power unit (unit 10 in the embodiment illustrated). The main PWM signal is passed on through Port#4 with no delay or distortion to the slave units such that all of the power units have access to the main PWM signal. The main PWM signal is processed by the pulse processing circuit 46 as a function of the regulation error E. In the master unit, switch 60 is closed so that the reference current $I_{ref}$ is equal to the input current signal $I_{in}$. Both $I_{ref}$ and $I_{in}$ are fed into the difference circuit 64 and subtracted from each other with the result that the regulation error E is always zero in the master unit. Thus, in the case of the master unit, the pulses in the main PWM signal exit the pulse processing circuit 46 unchanged and pass along PWM output line 48 to drive the associated power inverter 18. The power inverter 18 generates the local current feedback signal $I_{in}$ which is a normalized representation of the current generated by that inverter, and passes this to the paralleling interface 16 through Port#2. Since switch 60 is closed in the master unit, and open in all the slave units, the input signal $I_{in}$ of the master unit is used as the reference current signal $I_{ref}$ in all of the power units. The input current signal $I_{in}$ is also scaled by a factor of 1/N with scaler circuit 52, and added to the input feedback signal $I_{fbk-in}$ with adder 54. The output signal of adder 54 in the master unit is representative of the average normalized current generated by each unit in the multiparalleled system and this signal is passed through Port#1 to the main controller which uses it to control the pulse content of the main PWM signal.

Figure 5A:
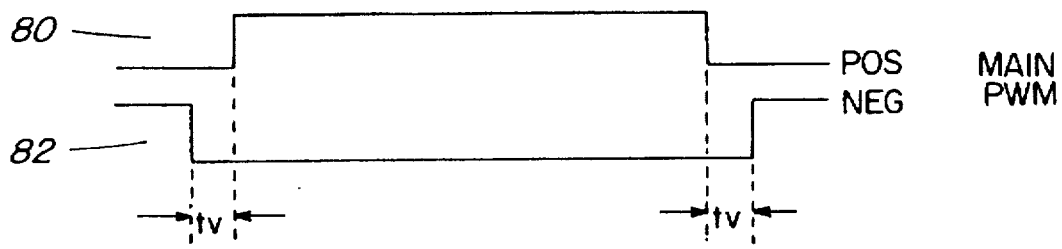
FIG. 5 is a timing diagram for local PWM pulse processing.
Figure 5B:
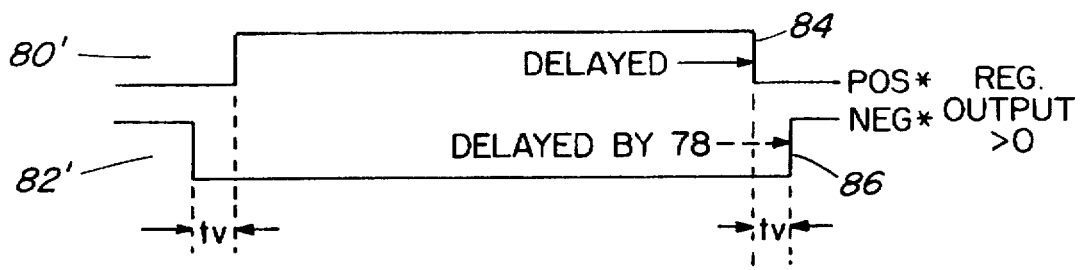
Figure 5C:
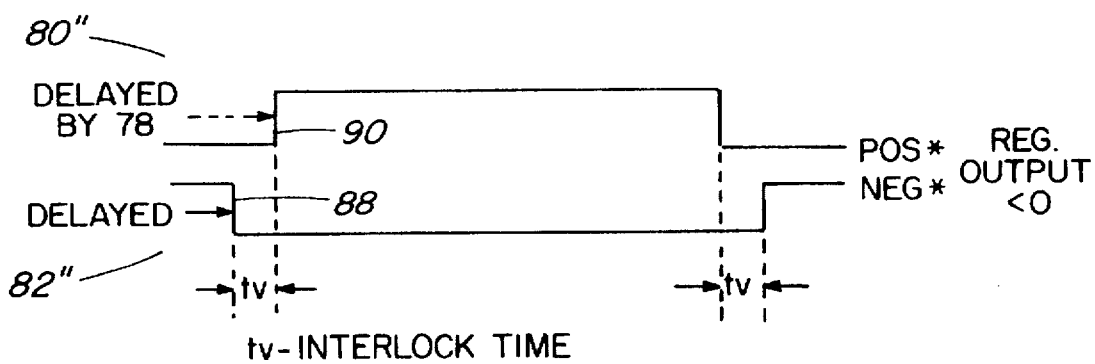

The operation of the slave power units will next be described. The slave units receive the main PWM signal through Port#3 with no delay or distortion. The main PWM signal is processed by the pulse processing circuit 46 as a function of the regulation error E. In a slave unit, switch 60 is open so that the reference current signal $I_{ref}$ is equal to the local current feedback signal $I_{in}$ of the master unit. Both $I_{ref}$ and the slave local current feedback signal $I_{in}$ are fed into the difference circuit 64 and subtracted from each other to produce the regulation error E representative of the difference between the $I_{ref}$ (which is the desired local current feedback signal) and $I_{in}$ which is the actual feedback current signal. If the regulation error E is not zero, then the pulses in the main PWM signal are delayed by an amount which is dependent upon the sign and magnitude of the regulation error E. The trailing edges of the positive pulses are delayed by pulse delay circuit 74 only when the output from the regulator is positive, while the trailing edges of the negative pulses are delayed by pulse delay circuit 76 only when the output of the regulator is negative. In most cases, a simple proportional regulator may be used to achieve good tracking accuracy, the amount of delay being proportional to the magnitude of the regulation error E. The delayed pulse signals are then passed to processor 78 which modifies the pulse signals if necessary to ensure that they have a proper minimum ON time, a minimum OFF time, and a proper interlock time. As a result, when the trailing edges of one of the PWM channels are adjusted, the leading edges of the pulses on the other channel are delayed as well. An example of this is shown in FIGS. 5a–5c. The main POS PWM signal 80 and the main NEG PWM signal 82 are shown in FIG. 5a. During the interlock time, tv, both POS PWM and NEG PWM pulses are Off. In FIG. 5b, the trailing edge 84 of POS PWM signal 80' has been delayed by delay circuit 74. As a result of this, to maintain a minimum interlock time, the leading edge 86 of the NEG PWM signal 82' is also delayed by the processor 78. In FIG. 5c, the trailing edge 88 of the NEG PWM signal 82" has been delayed. As a result, the leading edge 90 of the POS PWM signal 80" is also delayed by the processor 78. The pulse signals thus processed become the local PWM signal, and this is passed through Port#2 to drive the power inverter 18. As in the case of the master unit, the power inverter 20 generates the input current signal $I_{in}$ and passes this to the paralleling interface through Port#2. Since switch 60 is open in the slave units, the local current feedback signal $I_{in}$ has no effect upon the reference current signal $I_{ref}$. The input current signal $I_{in}$ is scaled by a factor of 1/N with scaler circuit 52, and added to input feedback signal $I_{fbk-in}$ with adder 54. The output signal of adder 54, $I_{fbk-out}$ is representative of the total current generated in the particular slave unit and any of the slave units to the right of that slave unit. $I_{fbk-out}$ is passed through port#3 to the power unit to the left of that particular power unit.

When one of the slave units fails, its power circuitry is detached from the rest of the system. In this case, the main PWM signal bypasses the paralleling interface of the failed unit to the paralleling interface of the unit to the right, and the feedback current signal bypasses the paralleling interface of the failed slave unit and is connected to the power unit to the left. The operation of the system thus can continue at a reduced power. When the master unit fails, the main controller 24 is disconnected from the master unit and connected to the first slave unit to the right of the former master unit. Switch 60 of the first slave unit is closed thereby causing it to assume the role of the master unit. Again, the operation of the system is restored at reduced capacity. This reconnection can be automatic or manual.

Figure 6:
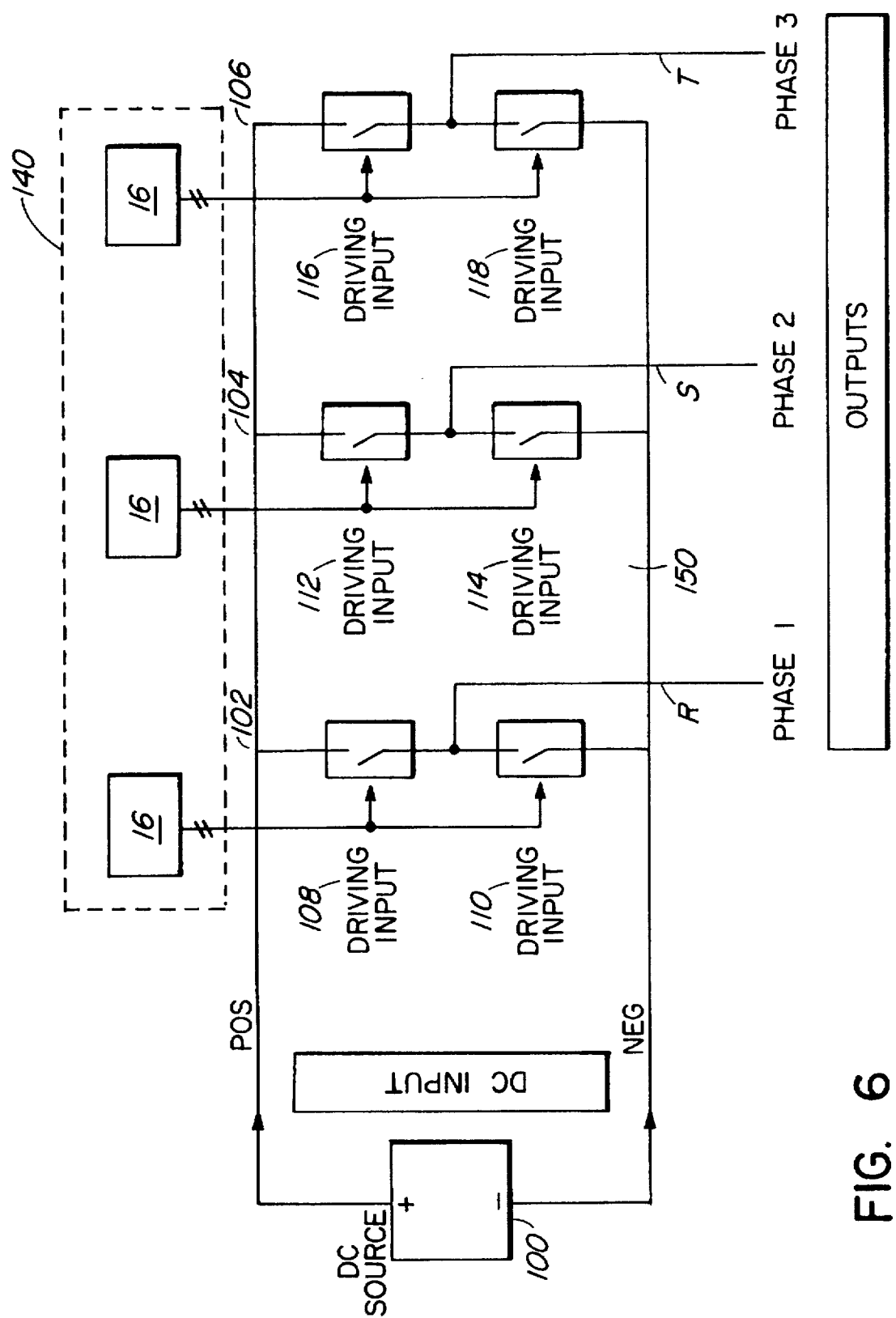
FIG. 6 is a block diagram of a three phase voltage source inverter.

It is noted that a three phase system requires three identical multiparalleling circuits. A block diagram of a three phase voltage source inverter topology is shown in FIG. 6. An input DC source 100 is connected to three branches 102,104,106 forming part of a three-phase voltage inverter circuit generally indicated by 150. Each of the three branches 102,104,106 operates like the power converter of FIG. 1 which is a single phase power inverter. That is, a pair of PWM signals 108,110 drive a pair of switches in branch 102, a pair of PWM signals 112,114 drive a pair of switches in branch 104, and a pair of PWM signals 116,118 drive a pair of switches in branch 106. Three separate paralleling interface circuits 16 like that illustrated in FIG. 3 are used to generate the PWM signals which are to drive the three single phase power converters which make up one three phase power converter, although the functionality of the three interface circuits may be combined into a single physical three phase paralleling interface circuit 140. A master controller (not shown) produces positive and negative main PWM signals which are used to drive the three branches. The PWM pulse pattern used to drive one phase is used to drive the remaining phases after being shifted by 120 and 240 electrical degrees respectively. These signals are the driving inputs 108,110 for branch 102, driving inputs 112, 114 for branch 104, and driving inputs 116,118 for branch 106. The three phase voltage source inverter 150 produces an output consisting of phases R,S, and T. In is noted that in FIG. 6, only the driving input signals are shown between the paralleling interface circuits 16 and the branches 102, 104, 106. It is to be understood however that each of these branches interacts with the respective interface circuit in a manner identical that described previously with respect to a single channel of FIG. 2.

Figure 7:
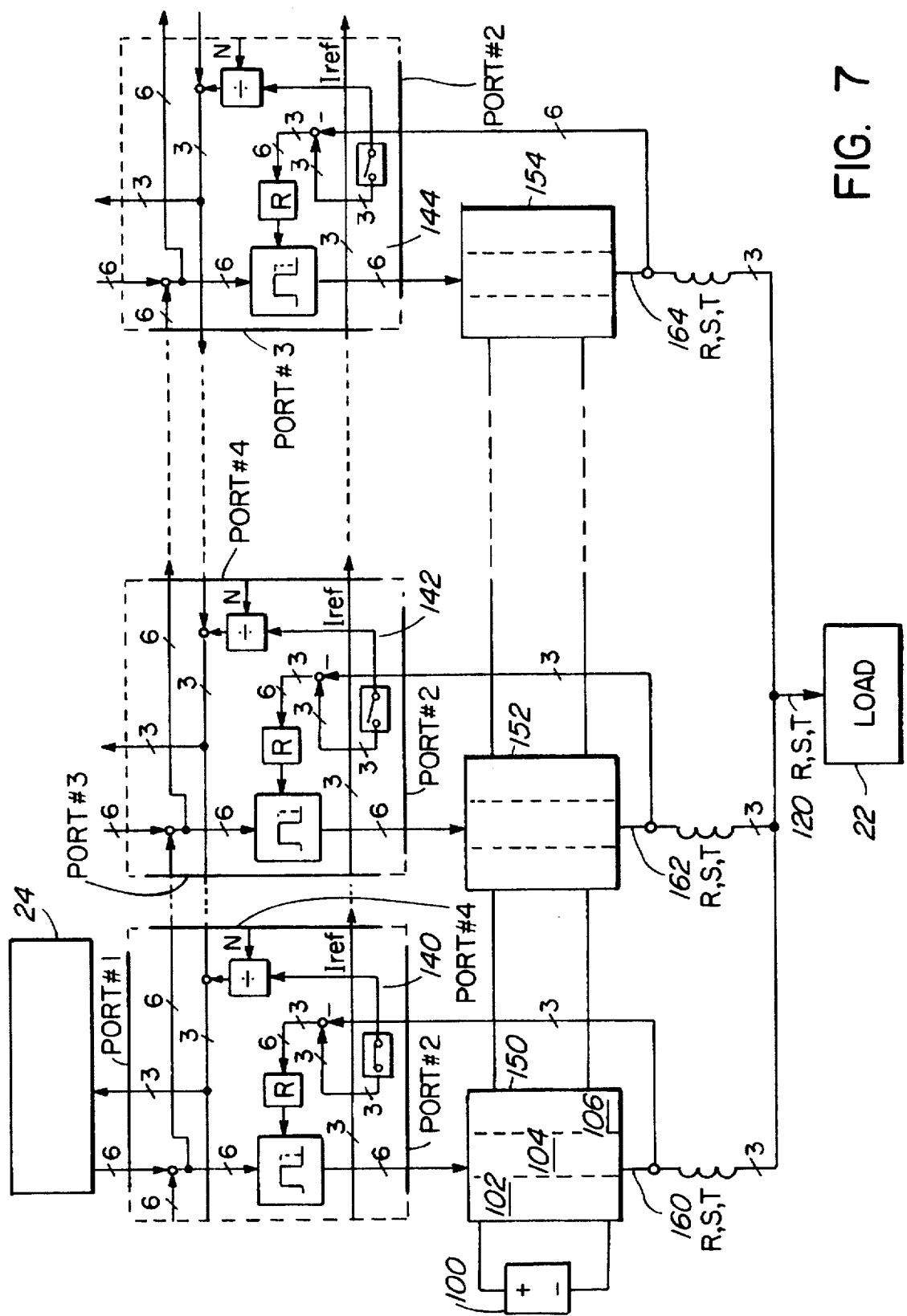
FIG. 7 is a block diagram of system of multiparalleled three phase voltage source inverters according to the invention.

Several three phase voltage source inverters such as the one shown in FIG. 6 are combined in a multiparalleled system according to the invention in FIG. 7. As before, a main controler 24 is provided to control a number of three phase paralleling interfaces 140,142,144 (only three shown) each of which is connected to a respective three phase voltage source inverter 150,152,154. Each three phase paralleling interface 140,142,144 contains three identical versions of the functionality of a paralleling interface for a single phase voltage source converter although for simplicity only a single version is shown. The outputs of all the reactors of the same phase are connected together and to the corresponding phase of the load.

Numerous modifications and variations of the present invention are possible in light of the above teachings. It is therefore to be understood that within the scope of the appended claims, the invention may be practised otherwise than as specifically described herein.

Automatic reconfiguration can easily be implemented by a circuitry (not shown) that senses the presence of the main controller on Port#1 and the lack of activity on Port#3. The lack of a connection to Port#1 qualifies a particular unit as a slave unit. Any other situation on Port#1 and Port#3 should activate a fault condition. Upon detection of a fault condition, if the faulty unit is the master, it is disconnected from the main controller, and the first slave unit is connected to the main controller. The switch of the first slave is closed to make it assume the role of the master. If the faulty unit is a slave, then the power inverter of that unit is simply disconnected. The current control signals and current feedback signals pass outside the paralleling interface of the faulty unit without being modified. These functions can all be implemented automatically.

In the embodiments described, PWM voltage source inverters have been used. More generally, any voltage source power converters that use pulse width modulation may be used. Voltage source inverters and synchronous rectifiers are typical examples of such converters. With some simplifications, DC choppers may be used. Voltage source inverters convert DC voltage into alternating voltage, single or multiphase; synchronous rectifiers perform conversion from AC voltages into DC; DC choppers convert DC voltage into a DC voltage of a different value. Different types of reactors are required for each different type of power converter.

The embodiments of the invention in which an exclusive property or privilege is claimed are defined as follows:

1. A PWM (pulse width modulation) multiparallel power converter system for driving a common load, the system comprising:

a plurality of power units each having a voltage source power converter which outputs a local current feedback signal representative of current generated by the voltage source power converter, and each having a reactor through which to connect the voltage source power converter to the common load;

PWM signal modification means for generating a local PWM signal for each voltage source power converter which is a version of a main PWM signal modified as a function of the difference between a reference current signal and the local current feedback signal of the respective power unit; and master unit selection means for selecting the current feedback signal of one of the power units as the reference current signal, thereby selecting that unit as the master unit.

2. A system according to claim 1 wherein the main PWM signal consists of a first series of PWM pulses carried on a positive channel and a second series of PWM pulses carried on a negative channel, the width of the pulses being selected to control the current generated by the system, each PWM pulse having a leading edge and a trailing edge, and said PWM signal modification means delays the trailing edges of the pulses in the first series of pulses if said difference is positive, and delays the trailing edges of the pulses in the second series of pulses if said difference is negative.

3. A system according to claim 2 wherein the amount of delay is proportional to the magnitude of the difference.

4. A system according to claim 3 further comprising means for adjusting the leading edges of the pulses after adjustment of the trailing edges to ensure that a minimum ON time, minimum OFF time, and interlock time exist.

5. A system according to claim 1 wherein said master unit selecting means comprises a switch for each power unit, wherein when a particular switch is closed the local current feedback signal for the respective power unit is connected to be the reference signal.

6. A system according to claim 5 wherein the switches are interconnected such that the switch for the master unit is closed and the remaining switches are open.

7. A system according to claim 1 further comprising scaling means for scaling the local current feedback signal of a given power unit, thereby allowing normalization of the local current feedback signals.

8. A system according to claim 1 wherein the power units are connected together in sequence, and only power units connected to one side of the master unit are operable.

9. A system according to claim 1 wherein each said voltage source power converter is a DC chopper.

10. A system according to claim 1 wherein each said voltage source power converter is a voltage source inverter.

11. A PWM multiparallel power inverter system comprising:
    main PWM command generation means which generates a main PWM command signal consisting of PWM pulses as a function of a main current feedback signal;
    a master power unit and at least one slave power unit, the main PWM command generation means being connected to supply the master unit with the main PWM command signal, and to receive the main current feedback signal from the master unit; the at least one slave unit being connected to receive from the master unit the main PWM command signal and a reference current signal;
    each power unit comprising:
    i) a voltage source power converter which generates current based upon a local PWM command signal, and generates a local current feedback signal representative of the current being generated by the respective voltage source power converter, the reference current signal being the local current feedback signal of the master unit;
    ii) PWM modification means for modifying the PWM pulses in the main PWM command signal as a function of the difference between the local current feedback signal and the reference current signal to create the local PWM command signal; and
    means for generating the main current feedback signal as a function of the local current feedback signals.

12. A system according to claim 11 wherein the power units are connected together in sequence, and only power units connected to one side of the master unit are operable.

13. A system according to claim 11 further comprising scaling means for scaling the local current feedback signal of a given power unit, thereby allowing normalization of the local current feedback signals.

14. A system according to claim 11 wherein the main PWM signal consists of first a series of PWM pulses carried on a positive channel and a second series of PWM pulses carried on a negative channel, the width of the pulses being selected to control the current generated by the system, each PWM pulse having a leading edge and a trailing edge, and said PWM signal modification means delays the trailing edges of the pulses in the first series of pulses if said difference is positive, and delays the trailing edges of the pulses in the second series of pulses if said difference is negative.

15. A system according to claim 14 wherein the amount of delay is proportional to the magnitude of the difference.

16. A system according to claim 15 further comprising means for adjusting the leading edges of the pulses after adjustment the trailing edges to ensure that a minimum ON time, minimum OFF time, and interlock time exist.

17. A system according to claim 11 wherein the master unit and the slave units can interchange their roles, the system further comprising master unit selecting means for selecting which power unit to assume the role of the master.

18. A system according to claim 17 wherein the master unit selecting means comprises a switch for each power unit, wherein when a particular switch is closed the local current feedback signal for the respective power unit connected to be the reference signal.

19. A system according to claim 18 wherein the switches are interconnected such that the switch for the master unit is closed and the remaining switches are open.

20. A PWM multiparallel power converter system comprising:
    a main controller which generates a main PWM command signal as a function of a main current feedback signal;
    a plurality of power units, each power unit comprising:
    i) a paralleling interface;
    ii) a voltage source power converter and output reactor;
    iii) a first signal path from the voltage source power converter to the paralleling interface for carrying a local current feedback signal representative of the current being generated by the respective voltage source power converter;
    iv) a second signal path from the paralleling interface to the voltage source power converter for carrying a local PWM command signal controlling how much current is generated by the voltage source power converter;
    each paralleling interface comprising:
    i) master unit selecting means for selecting the respective power unit as the master unit, the remaining power units being slave units, the main controller being connected to the master unit such that the master unit receives the main PWM command signal from the main controller, and the main controller receives the main current feedback signal from the master unit;
    ii) reference current means for providing a reference current signal from the master unit to each of the slave units, the reference current signal being equal to the local current feedback signal of the master unit;
    iii) summing means for summing all of the local current feedback signals to generate the main current feedback signal;
    iv) main command means for providing said main current command signal to each paralleling interface;
    v) PWM command modification means for modifying the main PWM command signal as a function of the difference between the local current feedback signal and the reference current signal to create the local PWM command signal such that the current generated approaches said reference current signal.

21. A system according to claim 20 further comprising scaling means for scaling the local current feedback signal of a given power unit, thereby allowing normalization of the local current feedback signals.

22. A system according to claim 20 wherein the power units are connected together in sequence, and only power units connected to one side of the master unit are operable.

23. A system according to claim 20 wherein the main PWM signal consists of first a series of PWM pulses carried on a positive channel and a second series of PWM pulses carried on a negative channel, the width of the pulses being selected to control the current generated by the system, each PWM pulse having a leading edge and a trailing edge, and said PWM signal modification means delays the trailing edge of the pulses in the first series of pulses if said difference is positive, and delays the trailing edge of the pulses in the second series of pulses if said difference is negative.

24. A system according to claim 23 wherein the amount of delay is proportional to the magnitude of the difference.

25. A system according to claim 24 further comprising means for adjusting the pulses after adjustment of the trailing edges to ensure that a minimum ON time, minimum OFF time, and interlock time exist.

26. A system according to claim 24 wherein the master unit selecting means comprises a switch for each power unit, wherein when a particular switch is closed the local current feedback signal for the respective power unit is connected to be the reference signal.

27. A system according to claim 26 wherein the switches are interconnected such that the switch for the master unit is closed and the remaining switches are open.

28. A paralleling interface for connection to a respective PWM voltage source power converter in a system of multiparalleled PWM voltage source power converters, the paralleling interface comprising:

main PWM signal input means for receiving a main PWM command signal;

local PWM signal output means for sending a local PWM signal to the respective voltage source power converter;

local current feedback input means for receiving from the respective voltage source power converter a local current feedback signal representative of the current generated in the voltage source power converter;

current feedback input means for receiving a current feedback signal from an adjacent paralleling interface;

master unit selecting means for switching the paralleling interface between assuming the role of a master and the role of a slave;

reference current output means for providing to an adjacent paralleling interface a reference current output signal equal to the local current feedback signal of the master unit in the case in which the paralleling interface is assuming the role of the master;

reference current input means for receiving from an adjacent paralleling interface a reference current input signal equal to the local current feedback signal of a unit assuming the role of the master in the case in which the paralleling interface is assuming the role a slave;

summing means outputting a main current feedback signal equal to the sum of the local current feedback signal and the current feedback signal;

PWM signal modification means for modifying the main PWM signal as a function of the difference between the local current feedback signal and the reference current signal to create the local PWM signal.

29. A system according to claim 28 wherein the main PWM signal consists of first a series of PWM pulses carried on a positive channel and a second series of PWM pulses carried on a negative channel, the width of the pulses being selected to control the current generated by the system, each PWM pulse having a leading edge and a trailing edge, and said PWM signal modification means delays the trailing edge of the pulses in the first series of pulses if said difference is positive, and delays the trailing edge of the pulses in the second series of pulses if said difference is negative.

30. An interface according to claim 29 wherein the amount of delay is proportional to the magnitude of the difference.

31. An interface according to claim 30 further comprising means for adjusting the pulses after adjustment of the trailing edges to ensure that a minimum ON time, minimum OFF time, and interlock time exist.

32. An interface system according to claim 28 further comprising scaling means for scaling the local current feedback signal of a given power unit, thereby allowing normalization of the local current feedback signals.

* * * * *